United States Patent [19]

Baker et al.

[11] 4,286,321

[45] Aug. 25, 1981

[54] COMMON BUS COMMUNICATION SYSTEM IN WHICH THE WIDTH OF THE ADDRESS FIELD IS GREATER THAN THE NUMBER OF LINES ON THE BUS

[75] Inventors: David C. Baker, Austin, Tex.; David F. Bantz, Chappaqua; Carlo J. Evangelisti, Jefferson Valley, both of N.Y.

[73] Assignee: International Business Machines Corporation, Armonk, N.Y.

[21] Appl. No.: 49,532

[22] Filed: Jun. 18, 1979

[51] Int. Cl.³ .............................................. G06F 7/04
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,972,028 | 7/1976 | Weber et al. | 364/200 |
| 4,016,545 | 4/1977 | Lipovski | 364/900 |
| 4,045,782 | 8/1977 | Anderson et al. | 364/200 |
| 4,112,490 | 9/1978 | Pohlman et al. | 364/200 |

OTHER PUBLICATIONS

Brown et al., "Instructions for Byte Addressing Capability", IBM Tech. Dis. Bull., vol. 16, No. 3, Aug. 1973, pp. 812-815.

*Primary Examiner*—Gareth D. Shaw
*Assistant Examiner*—Thomas M. Heckler
*Attorney, Agent, or Firm*—Jack M. Arnold

[57] ABSTRACT

The technique for transmitting address information between a processor and a plurality of memory subsystems in a common bus communication system. The width of the address field is greater than the number of lines on the bus. For example, addresses are three bytes wide, and the bus is one byte wide, thereby reducing the number of pins required on the processor and the subsystems. For communication between the processor and a given memory subsystem, only those bytes of a selected address which differ from the corresponding bytes of a previous address are transmitted sequentially for accessing a selected memory location.

7 Claims, 11 Drawing Figures

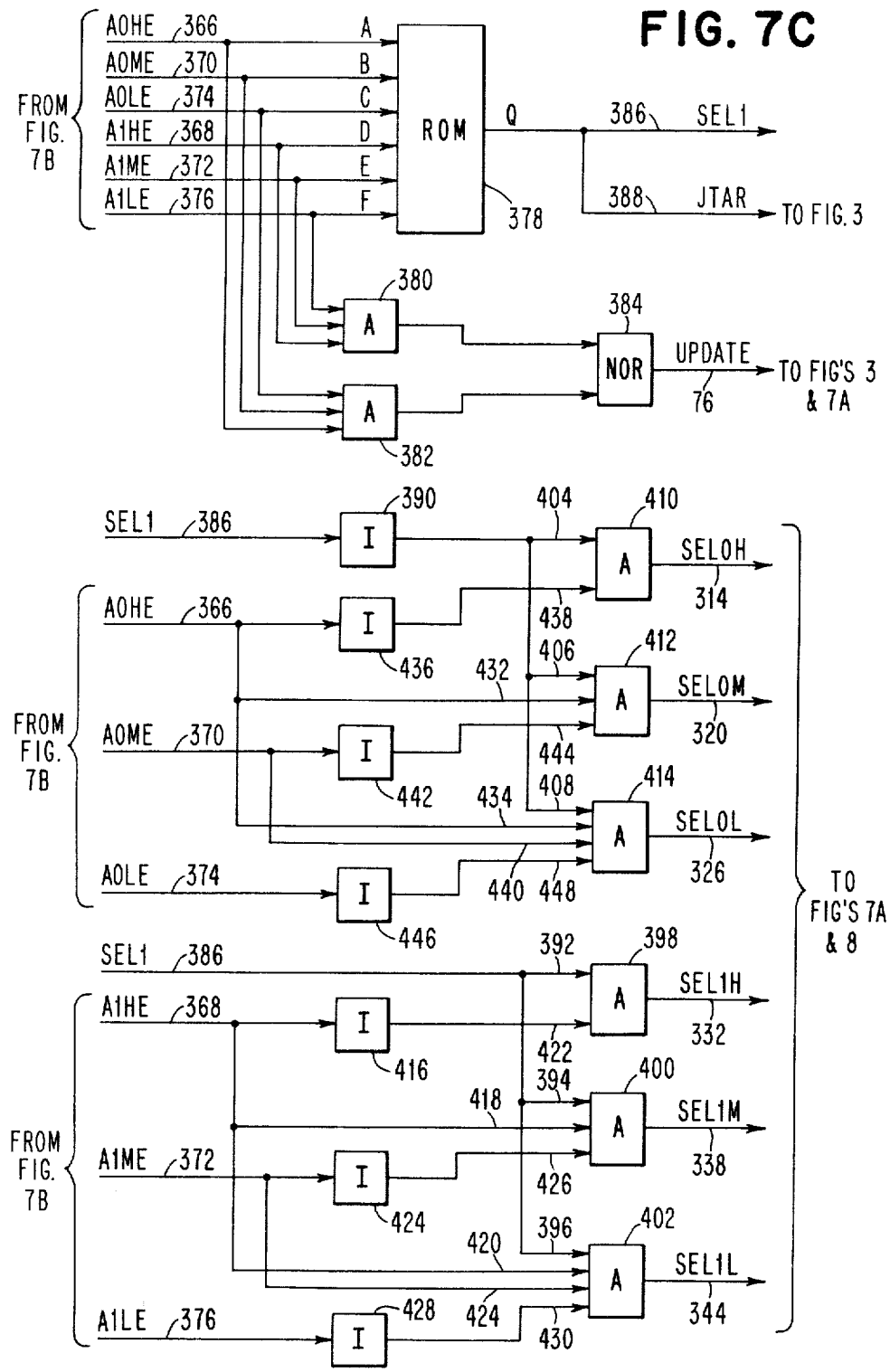

COMMON BUS COMMUNICATION SYSTEM IN WHICH THE WIDTH OF THE ADDRESS FIELD IS GREATER THAN THE NUMBER OF LINES ON THE BUS

DESCRIPTION

1. Technical Field

The invention is in the field of common bus communication systems, and especially systems for the transmission of addresses and data between the processing and memory elements of a data processing system. In particular, a common bus communication system is set forth wherein the number of lines on the bus, and the number of pins on the communication devices are reduced.

In microprocessor systems the addresses, data, and control information must be communicated between the microprocessor package and other packages in the environment. This is commonly accomplished by separate buses for the address and data information, although sometimes the data and address information is multiplexed onto the same bus. In any event, the number of microprocessor pins required to support a bus is equal to a number of bits in the bus. For example, a 16 bit address bus requires 16 pins on the microprocessor package.

It is desirable to reduce the number of pins on a package for several reasons: first, the cost of the package is strongly dependent on the number of pins, and second, the reliability of the system is increased with fewer pins, both because of the unreliability of connections between the pins and the circuit board that carries the package, and because of the unreliability of the internal bonds between the chip and the package pins. At the same time the demand for larger address fields to accommodate larger physical memories is increasing and the application for microprocessors becomes more sophisticated. For microprocessors with the capability for virtual memory, it is desirable to translate virtual to real addresses in the memory subsystem, and not on the microprocessor chip itself, so that relatively large virtual addresses must be communicated off-chip. The desirability of fewer pins and of larger addresses is of prime concern in the present invention.

The sequence of addresses generated by a processor has a behavior that can be exploited to reduce the number of address bits transmitted between the microprocessor and other elements of the system. Addresses of instruction tend to be sequential, in that in the absence of branching most microprocessors fetch the next sequential instruction. Branch instructions are often relative to the current contents of the program counter, and so branch target addresses are numerically close to the address of the branch instruction itself. Addresses of operands are also clustered in the address space because operand addresses relative to index register content are formed with a small displacement field in the instruction. Operand addresses may also be clustered due to block moves or table accessing. These characteristics of address generation are well known, but are accentuated in microprocessors because of the small displacement field in the instruction.

2. Background Art

There are several techniques known for the transmission of data between a microprocessor and other subsystem components, each having certain advantages and disadvantages. U.S. Pat. No. 3,972,028 to Weber et al describes a technique for simplifying the addressing procedure in a microprocessor system by providing each read only memory (ROM) chip with an address register for addressing all of the memory locations. The address word is changed in unitary binary value by counting pulses, with attainment of final address of the first chip automatically leading to addressing of the first memory location of the next chip. The total addressing time is kept low thereby, since only time for addressing within the chip is required as no address transmission takes place over the bus between the ROM and the control unit chip.

U.S. Pat. No. 4,016,545 to Lipovski describes a technique for reducing the amount of data transmitted between the central processing unit (CPU) and the memory by removing a set of registers from the CPU and placing them in a plurality of memory chip controllers. Each controller controls a page of memory and contains pointer registers for accessing data and control instructions so that it is generally not necessary to transmit data from the CPU to memory for each address.

According to the present invention, a common bus information transferring system is disclosed in which information to be transmitted, that is the number of bits on the bus in an integer submultiple of the width of the address field. The address of a subsystem is addressed by transmitting only those bytes of the address that differ from corresponding bytes of a recently accessed address.

BRIEF DESCRIPTION OF THE DRAWINGS

FIGS. 7a, 7b and 7c when taken together is a block diagram representation of the local store unit which is illustrated generally in FIG. 3;

DISCLOSURE OF THE INVENTION

Figure 1:
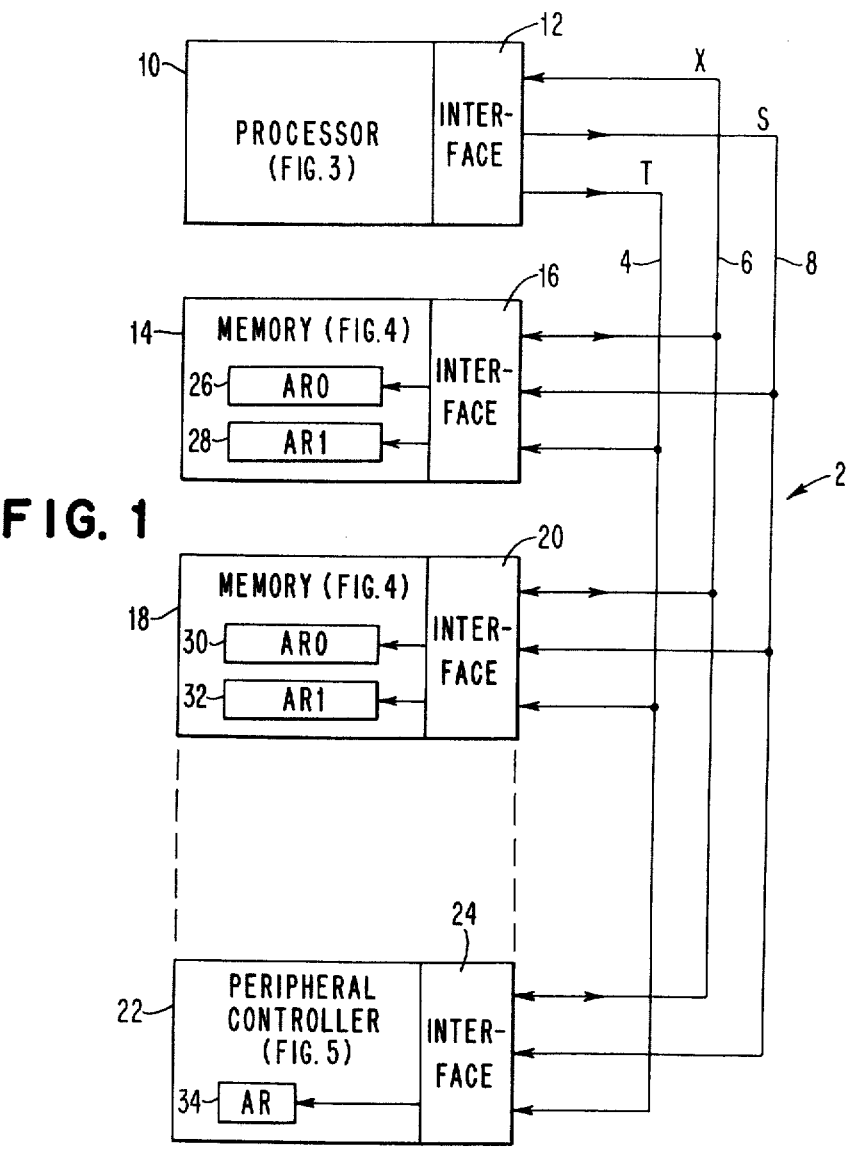
FIG. 1 is a block diagram representation of a common bus communication system according to the present invention.

A common bus communication system connected for information exchange between a processor and a plurality of subsystems, in which the width of the address field is greater than the number of lines on the bus. Each of the subsystems includes a memory array and at least one address register which stores the address of the last accessed memory location in the array. The processor includes a copy of the one address register of each subsystem. There is means included in the processor to select a given one of the subsystems to exchange information with. Further included in the processor, is means for comparing the copy of the one address register of the selected subsystem with the information to be exchanged, with only the bytes that differ being communicated to the one address register for updating same to select the correct address in the memory array.

BEST MODE OF CARRYING OUT THE INVENTION

A common bus communication system is illustrated generally at 2, with the common bus being comprised of a T-bus 4, an X-bus 6, and an S-bus 8. A processor 10 communicates with the buses 4, 6 and 8 via an interface 12 for communication with a plurality of subsystems. The subsystems may be comprised of memory type devices and/or pheripheral controller type devices. A memory type device 14 communicates with the buses 4, 6 and 8 via an interface 16. Another memory type device 18 communicates with the buses 4, 6 and 8 via an identical interface 20. A pheripheral controller device 22 communicates with the buses 4, 6 and 8 via an interface 24.

The processor transmits a signal S on the S-bus 8 for selecting one of the memory or pheripheral control devices to participate in the exchange of information with the processor. The width of the S-bus depends on the maximum number of devices which are attached to the T and X buses. Generally, the number of devices connected to the bus rarely exceeds 16 therefore for purposes of explanation the S-bus is chosen to be 4 bits wide. Data sent to a memory may be destined for a memory location whose address may be found in one of two address registers AR0, or AR1 which are numbered 26 and 28 respectively in the memory device 14. Like address registers 30 and 32 are found in the memory 18. A trunkated AR register 34 is found in the pheripheral controller 22. The address registers are divided into three sections termed "high", "middle" and "low", with each section being one byte wide. The function of the registers is to be described in detail shortly, relative to FIGS. 4 and 5.

The X-bus 6 is one byte wide and is used to send and receive information such as data and/or instructions from the processor 10 to the memory devices or pheripheral controller, and to carry information for updating a selected address register of a selected subsystem. In the latter mode the information is a portion of an address. The width of the address field is greater than the number of lines on the X-bus. In the example given, the number of lines on the bus is an integer submultiple of the width of the address field. The information to be transferred to the X-bus may be 3 bytes wide since the bus is only one byte wide, the information must be exchanged sequentially. However, as previously stated, in most instances the transmission of only one byte of information is required. The information is transmitted to the selected subsystem, and if it compares with the address of one of the two registers in the selected subsystems, then the data is exchanged.

Figure 2:
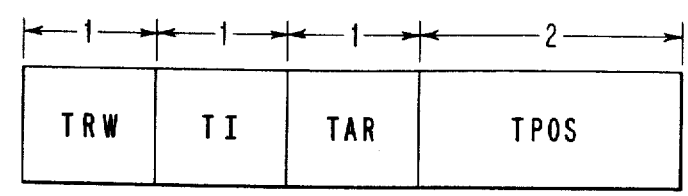
FIG. 2 is the format of the control signals utilized on the common bus in the practice of the present invention.

The T-bus 4 specifies the function to be performed by the selected subsystem, that is the selected memory or pheripheral controller. FIG. 2 illustrates the format of the signals of the T-bus.

The T-bus is grouped into four fields. The TRW field is one bit wide and specifies that data is transmitted from the processor to the memory if the bit is a binary ZERO and from the memory to the processor if the bit is a binary ONE. The TI field is one bit wide and specifies the source or destination of the information on the X-bus is one of the address registers (AR's) in a selected subsystem if the bit is a binary ZERO, or a memory array location in the subsystem if the bit is a binary ONE. The TAR field is one bit wide, and if a binary ZERO specifies that address register AR0 is to be used or if a binary ONE that address register AR1 is to be used to select an address in the selected memory device. The TPOS field is 2 bits wide and is interpreted as the binary representation of a number. This field contains the position number in the selected address register that is to be affected by the operation and is utilized only if the TI field is a binary ZERO. The specific functioning of the T-bus and the control signals will be described in more detail shortly.

Figure 3:
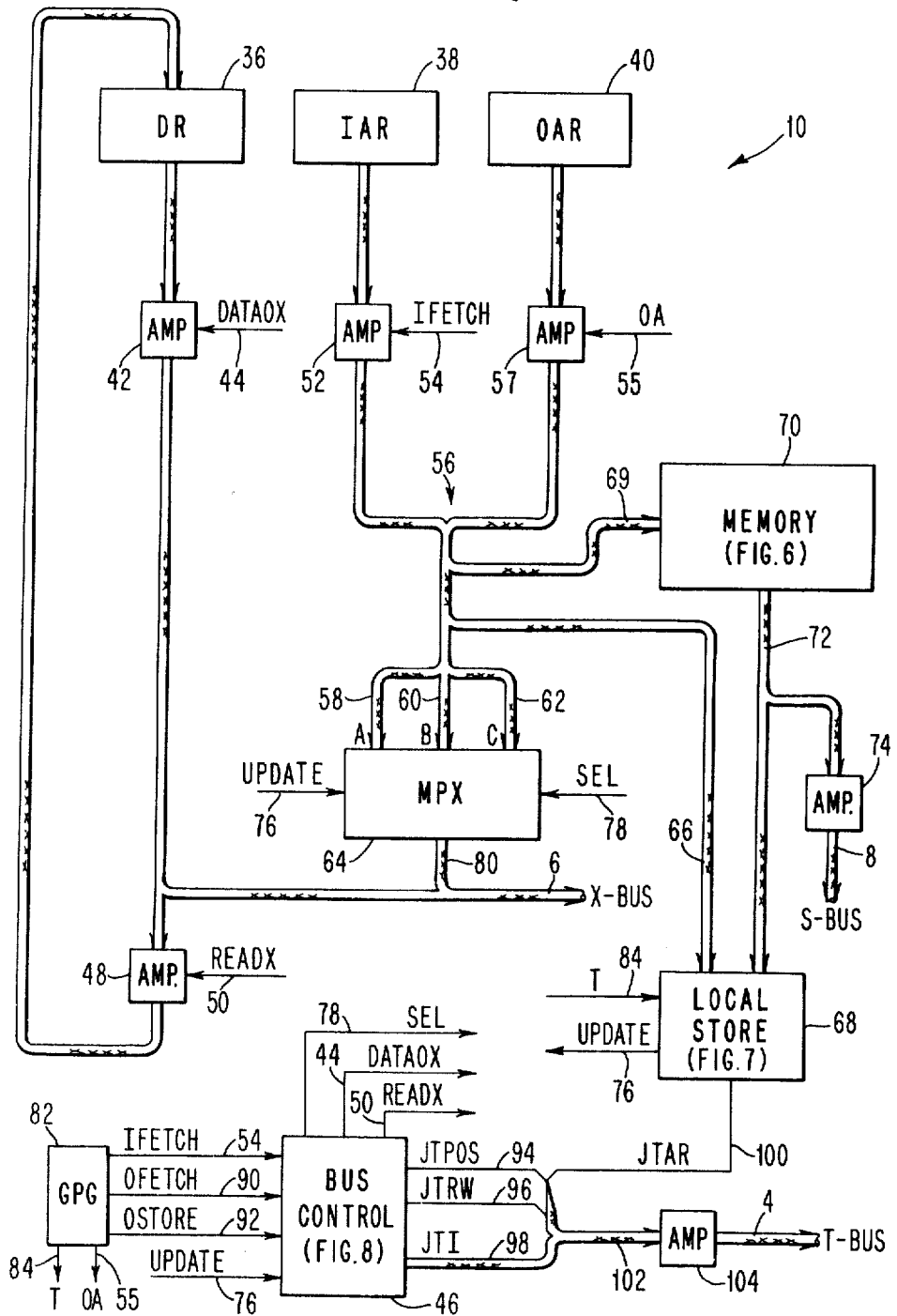
FIG. 3 is a block diagram representation of the processor which is illustrated in general form in FIG. 1.

Refer now to FIG. 3 which is a detailed block diagram of the processor 10 which is illustrated generally in FIG. 1. The processor includes a data register 36, instruction register 38 and operand address register 40. These registers perform the function that is normally assigned to these devices in a processor, and their operation is known to those skilled in the art. Accordingly, their detailed operation will not be described. The data register provides data to the X-bus 6 when an amplifier 42 receives an enabling DATAOX signal on gating line 44 from the bus control network 46. The data signal is one byte wide. Information on the X-bus 6 is read into the data register 36 when amplifier 48 is provided a READX signal on input gating line 50 from the bus control unit 46. When an instruction is required from the selected subsystem, an amplifier 52 has an enabling IFETCH signal applied to the gating line 54 thereof, for providing a three byte wide address to an address bus 56. Alternatively, when there is to be an operand access, an operand access signal (OA) 55 is provided to the gating input of an amplifier 57 for providing a three byte wide operand address to bus 56. These three bytes are termed the low order byte, the middle order byte, and the high order byte which are provided via lines 58, 60 and 62 respectively to a multiplexer 64, and via a line 66 to a local store unit 68.

The high order 12 bits of the instruction on address bus 56 are provided via a line 69 to a content address memory which decodes the 12 high order bits to determine which of the subsystems is to be selected. In response to the decoding of the 12 high order bits, a four bit signal termed S is provided at the output of the memory 70 on cable 72 to the local store unit 68 and to a buffer amplifier 74 for providing at the output thereof the select signal to the S-bus 8 for selecting which subsystem to exchange information with. The local store unit 68 contains a copy of the address registers AR0 and AR1 or AR of a peripheral controller of each of the subsystems, with each of these registers and the copies thereof containing the address of two memory locations in two separate regions of the memory. Each register contains the address of the most recently accessed location in that region. For example, suppose the processor accesses locations 1000, 1001, 1002, 3264, 3265, 1003 and 1004 in the order set forth. Then, AR0 would contain the address of 1004 and AR1 would contain the address for 3265. It is seen, that the addresses of 1004 and 3265 are the most recently accessed addresses in the two regions 1000–1004 and 3264–3265, respectively. The instruction address on line 66 provided to the local store unit 68 is compared with the copy of the two address registers of the selected memory subsystem as selected by the signal on the line 72, and in response thereto an update signal is provided on a line 76 to the multiplexor 64 indicating that one or more of the bytes on the input lines 58, 60 and 62 is to be updated sequentially as determined by a select signal provided on the line 78 from the bus control unit 46. This select signal sets forth which of the low, middle or high order bytes is to be updated and sent from the output line 80 of the multiplexor 64 to the X-bus 6 for providing an update, a byte at a time, of the address stored in the selected address register of the selected subsystem. Accordingly, there may be no update of the bytes, or there may be an update of one or more of the three bytes. If two or three of the bytes are to be updated, the updating is sequential, that is, a byte at a time, since the X-bus is only one byte wide.

A pulse generator 82 provides basic timing functions for the processor. A timing signal T is provided on an output line 84 to the local store unit 68 for providing timing thereof. The operand access signal (OA) 55 is provided to the amplifier 88 as a gating signal as previously set forth.

The instruction fetch signal IFETCH on line 54 from the pulse generator 82, which was applied as a gating signal to the amplifier 52 for gating the output of the instruction address register 38, is also applied to the bus control network 46. An OFETCH signal and an OSTORE signal are applied via lines 90 and 92 respectively to the bus control unit 46. The bus control unit 46 provides the necessary timing signals for the T-bus. The generation of these signals will be described in more detail relative to FIG. 8 which is a detailed block diagram of the bus control unit 46. The JTPOS, JTRW, and JTI signals are provided on output lines 94, 96 and 98 respectively of the bus control unit 46, with the JTAR signal being provided on an output line 100 of the local store unit 68. All of these T-bus control signals are provided via cable 102 to the buffer amplifier unit 104 for provision at the output thereof to the T-bus 4.

It is to be appreciated, that OA, IFETCH, OFETCH and OSTORE are normally generated within the processor by a combination of instruction decoding and processor sequencing, and are illustrated as being derived from pulse generator 82 for ease of description only.

Figure 6:
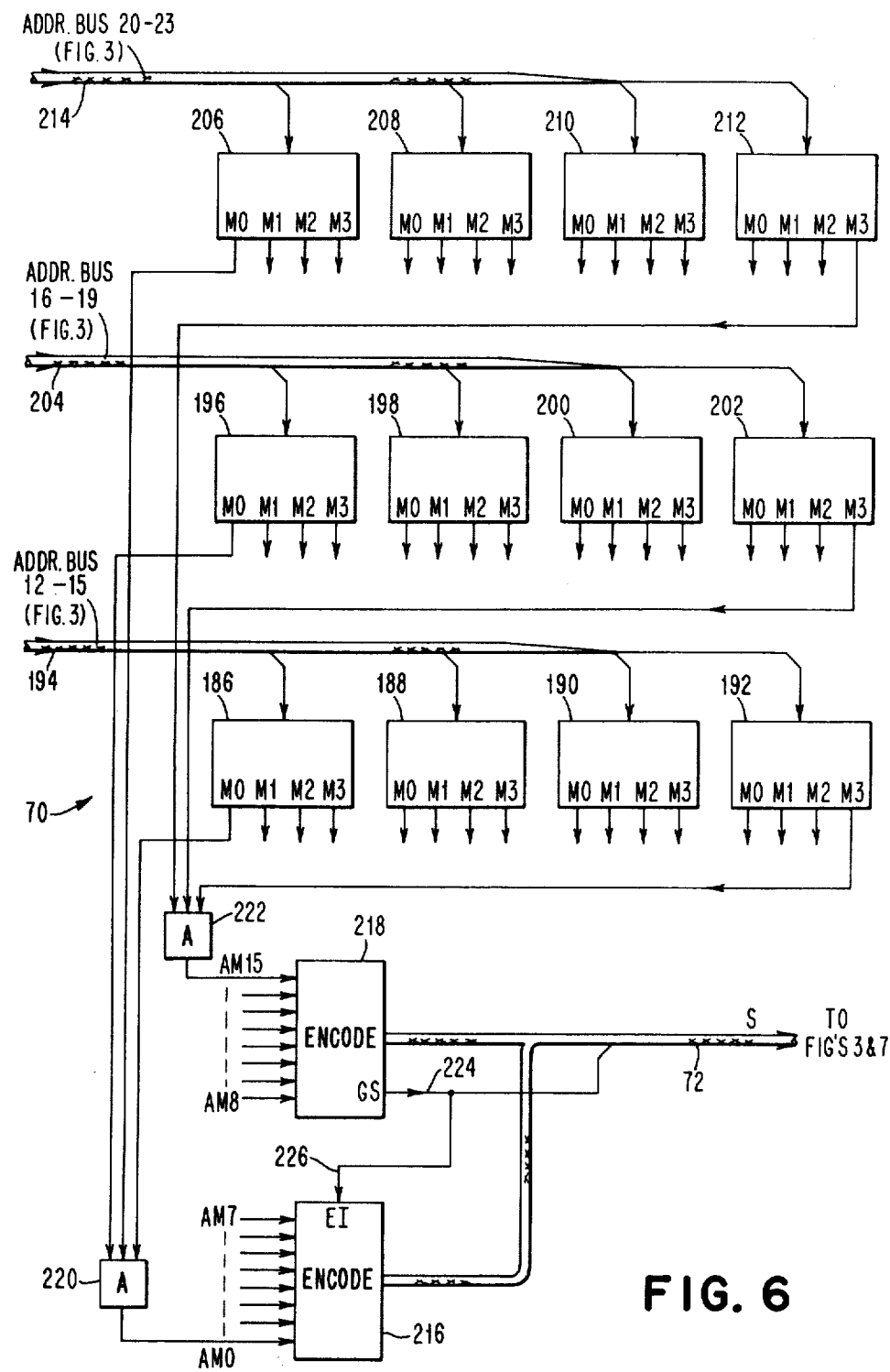
FIG. 6 is a detailed block diagram representation of the content addressed memory which is generally illustrated in FIG. 3.
Figure 7A:
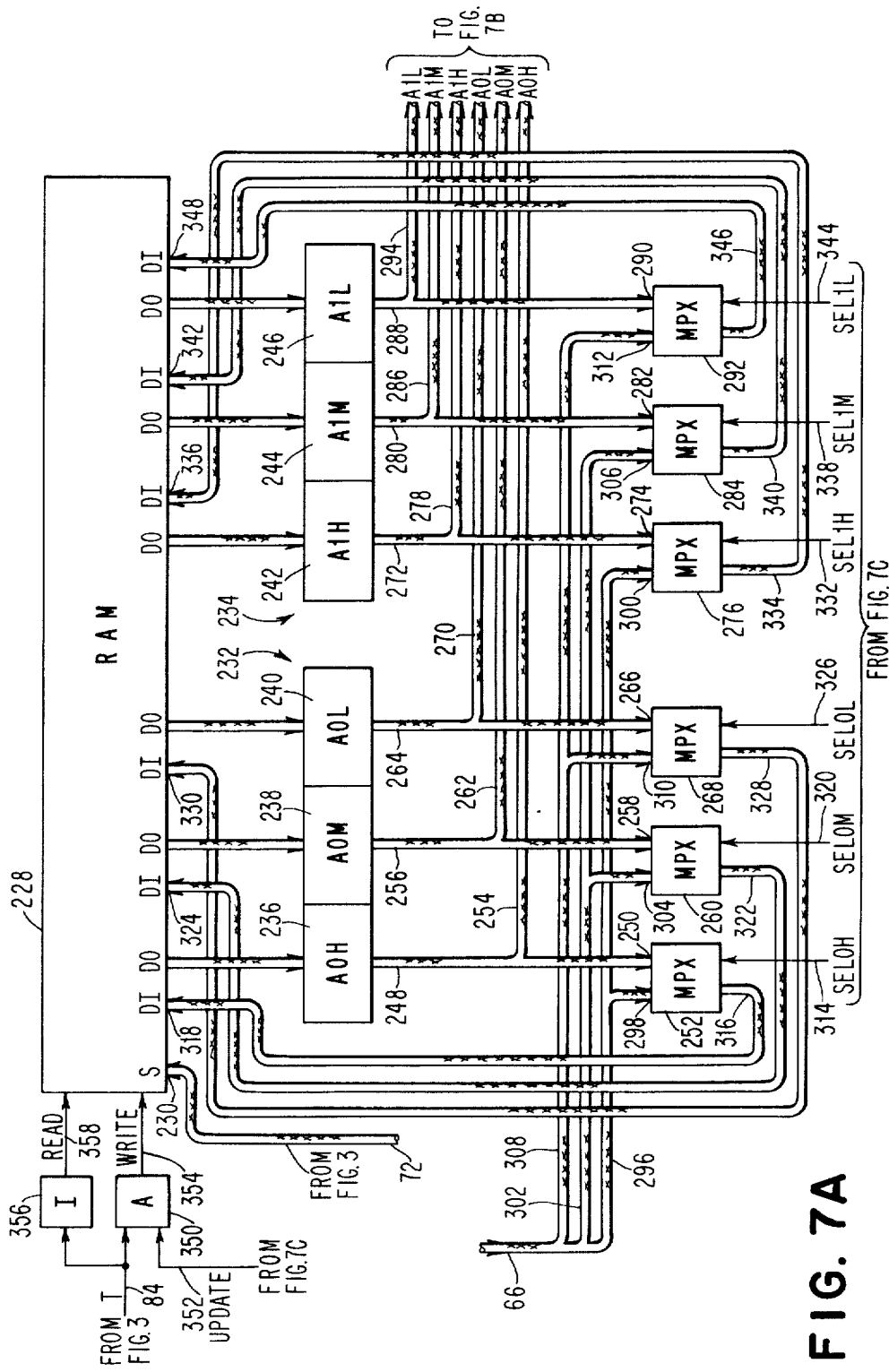
Figure 7B:
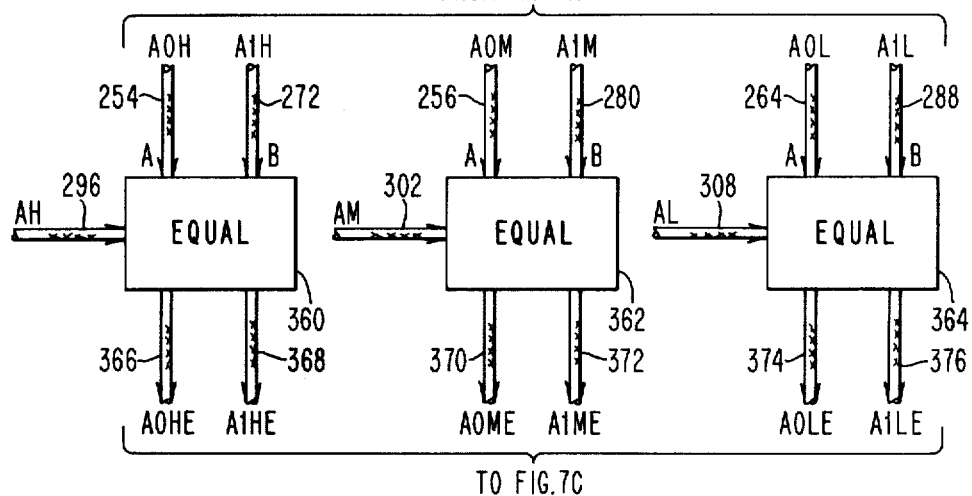

A detailed description of operation of the memory unit 70 is set forth in FIG. 6, and a detailed description of the local store unit 68 is set forth relative to FIGS. 7a, 7b, and 7c.

Figure 4:
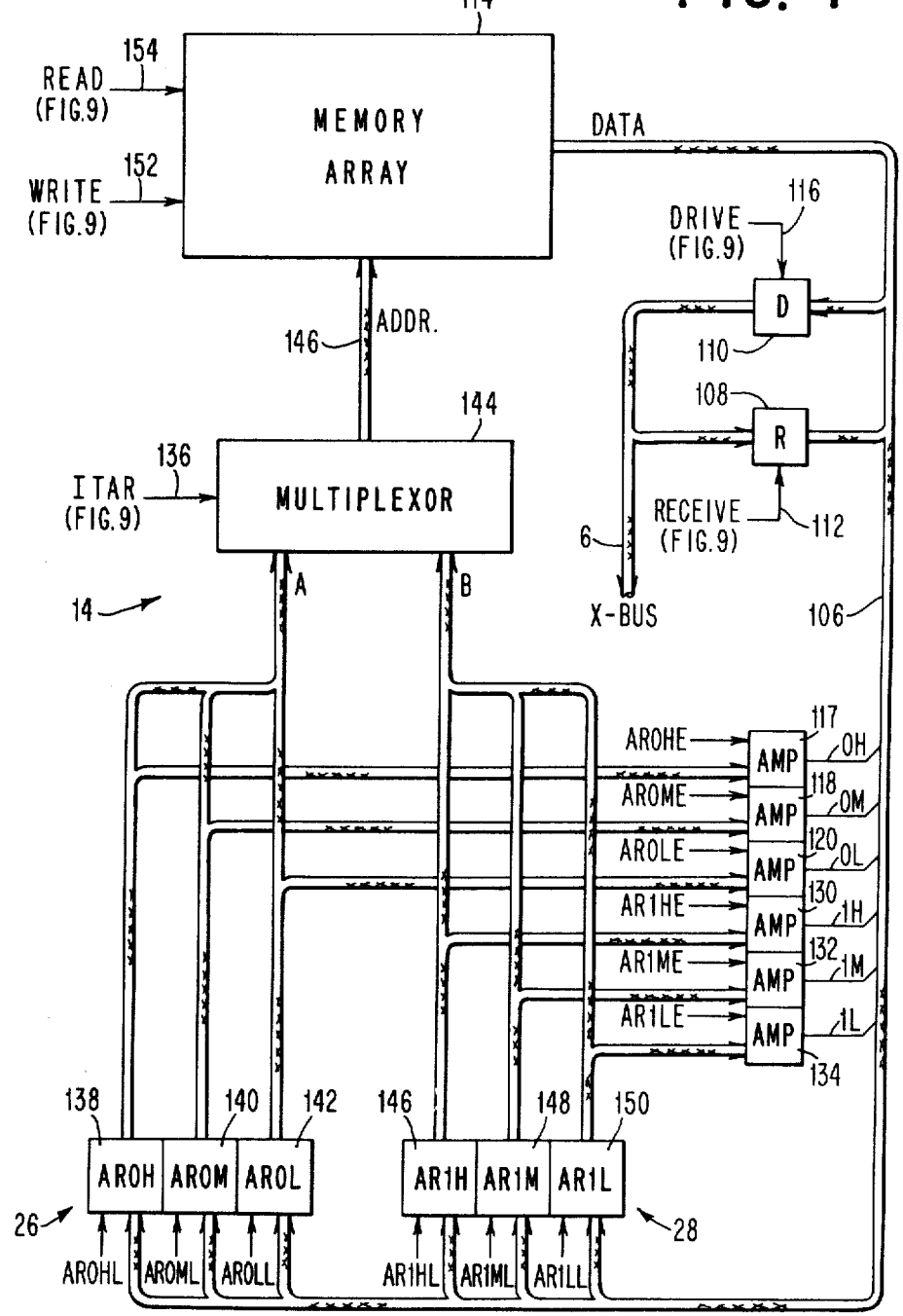
FIG. 4 is a detailed block diagram representation of the memory subsystems which are illustrated generally in FIG. 1.

Refer now to FIG. 4 which is a detailed block diagram of the memory subsystem 14 illustrated generally in FIG. 1. All of the other memory subsystems, such as 18, are identical. The X-bus 6 is connected to an internal bus 106 of the memory system 14 by a receiving amplifier 108 for receiving information from the X-bus, and a driving amplifier 110 for providing information to the X-bus. When the memory subsystem 14 is selected for information exchange, and the system is to receive information, a receive signal on line 112 enables the receiver 108 to pass the information from the X-bus 6 to the internal bus 106. The received information may be in the form of data from the data register 36, or portions of addresses from the instruction address register 38 or operand address register 40 of the processor illustrated in FIG. 3. The receive signal on line 112 is a control signal provided from the FIG. 9 which is indicative of this specific memory subsystem being selected, and the T-bus signal ITRW being a binary ZERO. Data is provided to a memory array 114, and addresses are provided to address registers 26 and 28. When information is to be provided to the processor from the memory subsystem 14, a drive signal 116 is a binary ONE which is indicative of this memory subsystem being selected and the signal ITRW being a binary ONE. Either data is provided from the memory array 114 to the internal bus 106, or an updated address is provided via one of a plurality of tri-state buffers 117, 118, 120, 130, 132 or 134. How these information signals are derived is to be described shortly.

Assume that one of the address registers AR0 and AR1, 26 and 28 respectively is selected and a byte is to be updated. AR0 is comprised of three stages 138, 140 and 142, and AR1 is comprised of three stages 146, 148 and 150. If it is necessary to update the contents of either AR0 and AR1 the portion of the address to update a selected portion of a selected address register is on the internal bus 106. If the stages 138, 140 or 142 of AR0 are to be updated the address portion on the internal bus 106 is gated into a given stage in response to a selected one of the gating signals AR0HL, AR0ML or AR0LL being a binary ONE. Similarly, if the stages 146, 148 or 150 of AR1 are to be updated the address portion on the internal bus 106 is gated into a given stage in response to a selected one of the gating signals AR1HL, AR1ML or AR1LL being a binary ONE.

The contents of the two address registers AR0 and AR1, 26 and 28 respectively, are available as inputs to multiplexor 144. If the contents of AR0 are to be used for accessing the memory array 114 the signal ITAR on line 136 is a binary ZERO, and the multiplexor 144 passes its "A" input to output cable 146. Conversely, if the contents of AR1 are to be used for accessing the memory array 114 the signal ITAR on line 136 is a binary ONE and the multiplexor 144 passes its "B" input to the output cable 146. If data is to be accepted from the X-bus into memory array 114, a WRITE signal is a binary ONE on the line 150 which is indicative of this memory subsystem being selected, the signal ITI being a binary ONE and the signal ITRW being a binary ZERO. If data is to be transmitted from the memory device 114, the READ signal on input line 154 is a binary ONE, and the drive signal on line 116 is a binary ONE enabling the driver amplifier 110 to gate data from the memory array 114 to bus 106 and from there to X-bus 6. The updated address bytes of the AR0 and AR1 registers 26 and 28, respectively, are provided via the tristate amplifiers to the internal bus 106 for retransmission to the data register 36 in the processor 10 (FIG. 3). The information in the data register 36 then may be reprocessed as an instruction or operand address for updating the local store unit 68 in the processor. One and only one of the tri-state buffers may be enabled at a given time for placing the contents of a selected stage of one of AR0 and AR1 on bus 106. Amplifier stages 117, 118, 120, 130, 132 and 134 are enabled by signals AR0HE, AR0ME, AR0LE, AR1HE, AR1ME and AR1LE, respectively, being at a binary ONE level. This insures that one and only one byte of information at a time is provided to the one byte wide X-bus for transmission to the processor 10. This corresponds to one and only one byte of information being provided from data register 36 or multiplexor 64 of processor 10 (FIG. 3) to the X-bus 6. The generation of the various control signals in FIG. 4 will be described in detail relative to FIG. 9.

Figure 5:
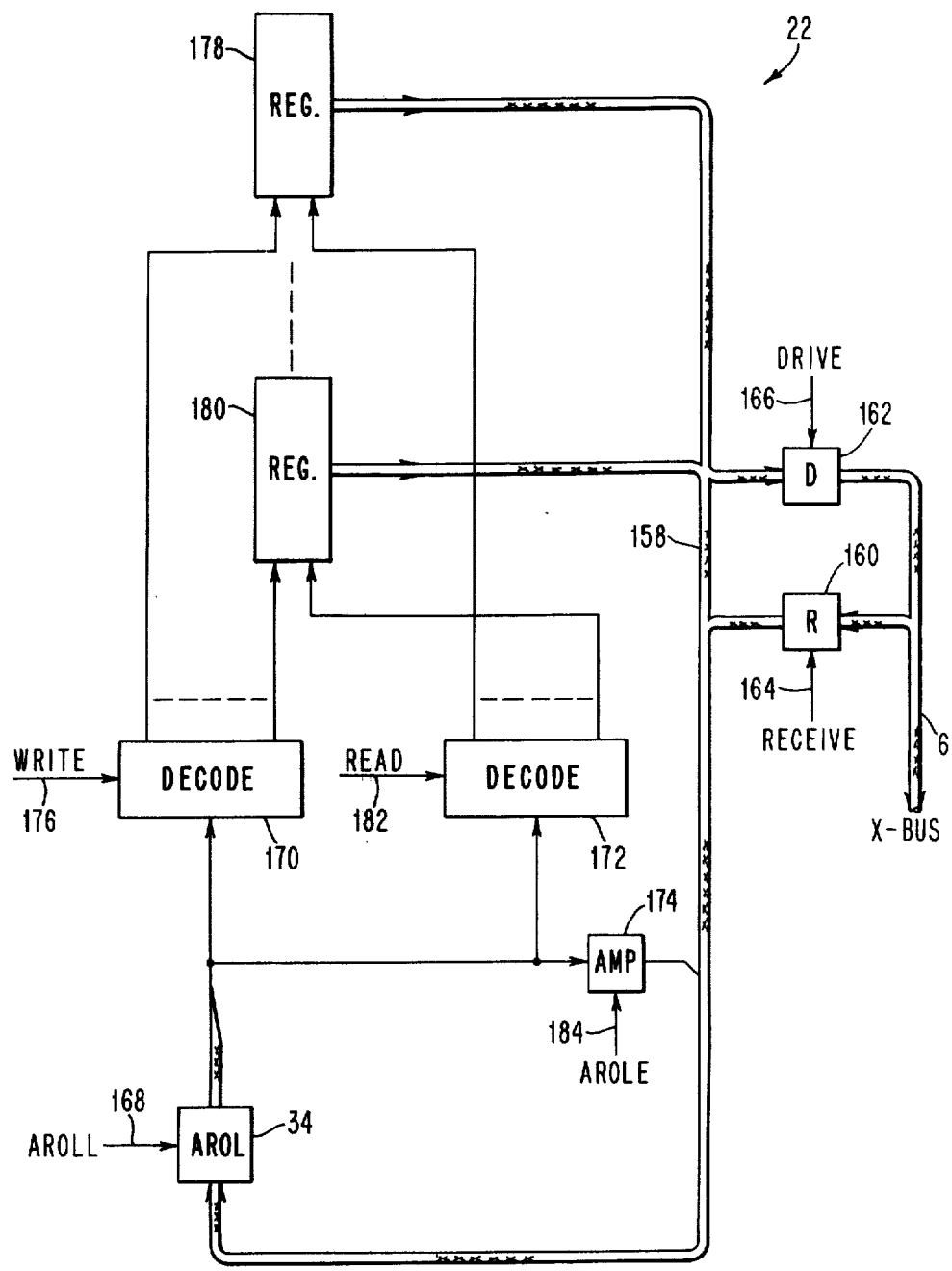
FIG. 5 is a detailed block diagram representation of the peripheral controller which is illustrated generally in FIG. 1.

FIG. 5 is a detailed block diagram of the peripheral controller 22 which is illustrated generally in FIG. 1. The peripheral controller consists of a number of registers, like a memory array, which can contain the current status of the peripheral device to be controlled or may contain control data to cause the device to perform a set of actions. The only real difference from a memory array is in the number of registers, and the consequent need of only one section of one address register, and in the explicit decoding by decodes 170 and 172. The X-bus 6 is connected to an internal bus 158 of the controller 22 via a receiving amplifier 160 and a drive amplifier 162. The receiving amplifier 160 is enabled when the receive signal is provided to an enabling line 164, for receiving information from the X-bus, and the drive amplifier 162 is enabled when a drive signal is provided to an enabling line 166, for providing information from the peripheral controller 22 to the X-bus 6. Assume that the receiving amplifier 160 is enabled, and an address is provided thereto via the X-bus 6 and to the internal bus 158 to the input of address register 34. Signal AR0LL is provided on line 168 to update AR0L, register 34. The address register 34 provides this address as an input to decoders 170 and 172, as well as to the input of an amplifier 174. When information is to be written into the controller, a WRITE signal is at a binary ONE level on a line 176, and the address indicated in address register 34 is decoded selecting one of eight internal registers 178 through 180 which is to be accessed. In response to a drive signal at a binary ONE level on line 166, the driver 162 is enabled to transmit output data from the selected one of the registers 178 to 180 when a READ signal at a binary ONE level is provided on the input line 182 to the decoder 172 for selecting which of the registers 178 through 180 is to be read out. When the address from the register 34 is to be provided to the internal bus 158 and in turn to the X-bus 6 via the driver 162, a gating signal AR0LE at a binary ONE level on gating line 184 is provided to the amp 174 for gating this address out. The control signals provided to the peripheral controller are generated in a manner similar to those set forth for generating the control signals for the individual memory subsystems, as will be explained for a memory subsystem relative to FIG. 9.

FIG. 6 is a detailed block diagram of the content addressable memory (CAM) 70 which is illustrated generally in FIG. 3. As previously described, this memory compares the high order 12 bits of the address bus 56 of FIG. 3 with pre-stored address data in order to determine the contents of the S-bus necessary to select the appropriate sybsystem to exchange information with. The memory is composed of 12 four bit per word content addressable memory integrated circuits. CAMS 186, 188, 190 and 192 receive high order bits 12–15 on cable 194; CAMS 196, 198, 200 and 202 receive high order bits 16–19 on cable 204; and CAMS 206, 208, 210 and 212 receive high order bits 20–23 on cable 214. Each of these CAMS compare their four bit inputs with stored data and raise their match outputs M0, M1, M2 or M3 if a match occurs. For example, if the input matches the first four bit word stored in CAM 206 the M0 output is 1. The first four bits of 16 stored addresses are stored in CAMS 206, 208, 210 and 212; the second four bits in CAMS 196, 198, 200 and 202; and the last four bits in CAMS 186, 188, 190 and 192. In other words, CAMS 206, 196 and 186 store four complete addresses. The match outputs are ANDED together to form 16 signals one for each of the stored addresses. These signals are designated AM0 through AM15 as inputs to encoders 216 and 218. For example, the M0 outputs from each of the respective CAMS 206, 196 and 186 are ANDED together in AND gate 220 to provide the AM0 input to encoder 216, and the M3 output of each of the CAMS 212, 202 and 192 are ANDED together in an AND gate 222 to provide the AM15 to the encoder 218. Each of the remaining AM1 through AM14 inputs are derived by ANDING the same match outputs from the respective CAMS. It is seen that the AM0 input to encoder 216 is true, that is a binary ONE level, only if the high order 12 bits of the address bus 56 (FIG. 3) match the contents of the first stored address. The encoders 216 and 218 perform the binary encoding of AM0 through AM15 into a four bit binary number which is utilized to select the address of the memory subsystem to exchange information with, as the select signal S on output line 72, as well as providing the select input to the local store unit 68. The output on line 224 from the GS output of encoder 218 to the EI input on line 226 of encoder 216, prevents 216 from driving the S-bus if a match has occurred on AM8 through AM15. The GS output on line 224 is also used as the most significant bit of the select signal S on cable 72.

The local store unit which is illustrated generally at 68 in FIG. 3 is set forth in detail in block diagram form in FIGS. 7a, 7b and 7c. As previously set forth, the local store unit 68 stores a copy of the address registers AR0 and AR1 or AR in each of the subsystems. In response to the select signal S from the memory 70 (FIG. 6) the copy of AR0 and AR1 of the selected subsystem or copy of AR if the selected subsystems is a peripheral controller, is compared with the address signal on line 66 to determine which copy AR0 and AR1, or AR for a peripheral controller, most closely matches, and to update the one which most closely matches. Referring now to FIG. 7a, the local store unit 68 includes a random access memory device (RAM) 228 which has the select signal applied to an input 230 thereof from the cable 72 at the output of the memory device 70 (FIG. 3). In response to the select signal S a copy of the selected address register 0 (AR0) and address register 1 (AR1) of the selected memory subsystem is applied to registers 232 and 234 respectively. Register 232 contains a copy of the AR0 register with the high order byte being applied to register stage 236, the middle byte being applied to register stage 238 and the low order byte being applied to register stage 240. A copy of the AR1 register is stored in register 234, with the high order byte being stored in register stage 242, the middle order byte being stored in register stage 244 and the low order byte being stored in register stage 246. The output of the high order stage of register 232 is applied via a line 248 to a first input 250 of a multiplexor 252 and to an output line 254. The output of the middle order stage is applied via a line 256 to a first input 258 of a multiplexor 260 and to an output line 262. The output of the low order stage 240 is applied via a line 264 to a first input 266 of a multiplexor 268 and to an output line 270. With reference to the copy of address register 1, the output of the high order stage is applied via an output line 272 to a first input 274 of a multiplexor 276 and to an output line 278. The output from the middle order stage is applied via a line 280 to a first input 282 of a multiplexor 284 and to an output line 286. The output of the low order stage 246 is applied via a line 288 to a first input 290 of a multiplexor 292 and to an output line 294. The output lines from the registers 232 and 234 are applied as input signals to FIG. 7b, and their respective functions will be described in detail shortly.

The low order, middle order and high order bytes of the address bus 66 are applied to the local store unit 68, with the high order byte being applied via a line 296 to a second input 298 of multiplexor 252 and a second input 300 of the multiplexor 276. The middle order byte from the address bus is applied via line 302 to a second input 304 of the multiplexor 260 and a second input 306 of the multiplexor 284. The low order byte is applied via a line 308 to a second input 310 of the multiplexor 268 and a second input 312 of the multiplexor 292. A plurality of select signals, which are generated in apparatus illustrated in FIG. 7c, are provided to control inputs of the respective multiplexors. If the select signal is at a binary ZERO level this is indicative of the particular byte stored in the associated address register stage being identical to the corresponding byte on the address bus, such that the output from the corresponding address register stage is channeled through the multiplexor to the output thereof and to the associated data input DI of the RAM 228 for maintaining the copy in the associated address register stage in its present state. On the other hand, if the select signal is at a binary ONE level this is indicative of the byte on the address bus differing from the byte in the corresponding stage of the address register, and the multiplexor channels the byte from the address bus to the output line thereof and to the data input DI of that stage of the RAM 228 such that the copy is updated in the associated register stage. That is, the data input lines (DI) to the RAM 228 are used to update a copy of an address register stored in the RAM. When the RAM is the next read out, the appropriate register stage in one of the registers 232 or 234 is updated. A select signal SEL0H is applied via a line 314 to the control input of the multiplexor 252 for selecting which input is channeled to output lines 316 thereof to the data input 318 for the high order byte of register stage 236. A select signal SEL0M is applied via line 320 to the control input of multiplexor 260 for selecting which input of the multiplexor is provided to output line 322 thereof to be applied to the data input line 324 for the middle order byte of address register stage 238. A select signal SEL0L is applied via line 326 to the control input of multiplexor 268 for selecting which input signal is applied to output line 328 thereof for application to the data input line 330 for the low order byte of address register stage 240. A select signal SEL1H is applied via line 332 to the control input of multiplexor 276 for selecting which input signal is provided to output line 334 thereof for provision to the data input 336 of the high order byte for address register stage 242. A select signal SEL1M is applied via a line 338 to the control input of multiplexor 284 for selecting which input signal is provided to an output line 340 thereof for provision to data input 342 of the middle order byte of address register stage 244. A select signal SEL1L is applied via a line 344 to the control input of multiplexor 292 for selecting which input signal is applied to output 346 thereof for application to data inputs 348 of the low order byte for address register stage 246. An AND gate 350 has a timing signal T from line 84 provided to a first input thereof and an UPDATE signal from FIG. 7c applied to an input line 352 thereof. A WRITE signal is provided on an output line 354 of the gate 350 to the RAM 228 for enabling informaton to be written therein. The timing signal T on line 84 is also provided to the input of an inverter 356 which provides a READ signal on output line 358 to the RAM 228 for enabling the RAM to be read. Thus, during the portion of time that timing signal T is at a binary ZERO level, the RAM 228 is read out to registers 232 and 234. When T is at a binary ONE level, and the UPDATE signal on line 352 is concurrently at a binary ONE level, the RAM is written into from the outputs of multiplexors 252, 260, 268, 276, 284 and 292. The output signals from registers 232 and 234 are provided to the compare network of FIG. 7b.

FIG. 7b includes compare networks 360, 362 and 364 for determining which of the bytes of the respective copies of the address register AR0, register 232, and address register AR1, register 234, of the selected memory subsystem matches the respective bytes appearing on the address bus of the processor. The comparison network 360 receives the high order byte AH from the address bus on a line 296 for comparison with the high order byte A0H on line 254 from register stage 236 of register 232 and the high order byte on line 272 from the address register stage 242 of the registor 234. If the byte A0H or A1H is equal to the byte AH on line 296 the signals on output lines 366 and 368, which are termed A0HE and A1HE respectively are at a binary ONE level and alternatively are at a binary ZERO level if there is no match. The comparison network 362 receives the middle order byte AM from the address bus on line 302 for comparison with the middle order bytes A0M and A1M from register stages 238 and 244 on input line 256 and 280 respectively. If there is a match, the signals A0ME or A1ME on lines 370 and 372 respectively are at a binary ONE level whereas if there is no match the respective signals are at a binary ZERO level.

The low order byte AL from the address bus is applied via line 308 to the comparison network 364 for comparison with the low order bytes A0L and A1L from register stages 240 and 246 on lines 264 and 288 respectively. If there is a match, the signals A0LE or A1LE on output lines 374 and 376 respectively are at a binary ONE level, and if there is a no match the respective signals are of a binary ZERO level. The output lines from the comparator network, are applied as input signals to various networks of FIG. 7c for providing the update signal and the select signals which are applied to the multiplexors of FIG. 7a.

With reference to FIG. 7c, each of the comparison output signals from the comparators of FIG. 7b are applied as input signals to a READ only memory (ROM) 378, with the bytes indicative of a copy of address register AR1 being applied to an AND gate 380, and the bytes indicative of a copy of address register AR0 being applied to an AND gate 382, with the outputs of the AND gates 380 and 382 being applied as inputs to a NOR network 384. The signal SEL1 appearing on output line 386 of the ROM 378 is a binary ONE if the local copies of address register AR1, that is the register 234 in FIG. 7a, more closely matches the current contents of the address bus 66 then does the local copy of address register AR0, that is to the register 232 of FIG. 7a. By more closely matches is meant that fewer bytes of the local copy mismatch the corresponding bytes of the address bus. For example, if the middle and low order bytes of the local copy of address register AR0 do not match the corresponding bytes of the address bus but only the high order bytes of the local copy of address register AR1 differs from the high order byte of the address bus, then SEL1 is a binary ONE. The signal SEL1 on line 386 is also applied via line 388 as T-bus signal JTAR which selects an address register in the selected memory subsystem. The signal SEL1 is derived from A0HE, A0ME, A0LE, A1HE, A1ME, and A1LE by the 64 word, 1-bit-per-word ROM 378. These signals are applied to the ROM 378 as an address, with A0HE being the most significant bit. For example, if the address is 100010 (decimal 34), the stored bit at location 34 in the ROM is a binary ONE. In this example, A0ME and A0LE are ZERO indicating a mismatch between the stored copy of AR0 and the current contents of the address bus in the middle and low order bytes. A1HE and A1LE are ZERO indicating a mismatch between the stored copy of AR1 and the current contents of the address bus in the high and low order bytes. Since both AR0 and AR1 mismatch the current address in two byte positions, the decision as to which to update is arbitrary. In this instance, the choice is made to update AR1. In a similar manner the entire contents of the ROM 378 is determined. This implementation is more regular and more amenable to integration than the determination of the signal SEL1 with AND and OR gates and inverters. The signal UPDATE which appears on the output line 76 of the NOR gate 384 is indicative that at least one byte of a memory address register must be updated before a memory array access can be made. It is seen that the signal UPDATE is a binary ONE only if neither local copy of an address register matches the current contents of the address bus.

The SEL1 signal is used to determine whether a byte of the copy of address register AR0, register 232, or address register AR1, register 234, is to be updated. That is, a given byte of address register 232, is to be updated if SEL1 is a binary ZERO, and a given byte of address register 234, is to be updated if SEL1 is a binary ONE. The update signals are SEL0H, SEL0M and SEL0L for the multiplexors associated with the copy of address register AR0, register 232, and SEL1H, SEL1M and SEL1L for the multiplexors associated with the copy of address register AR1, register 234. The signal SEL1 is provided to the input of an inverter 390, and to first inputs 392, 394 and 396 of AND gates 398, 400 and 402 respectively. If SEL1 is a binary ONE, this signal is inverted by inverter 390 and is provided as a binary ZERO signal to first inputs 404, 406 and 408 of AND gates 410, 412 and 414 respectively. The binary ZERO signal inhibits each of these gates, and therefore none of the select signals are provided to the multiplexors 252, 260 and 268 (FIG. 7a). If SEL1 is a binary ONE, each of the gates 398, 400 and 402 are primed. One and only one of these gates may provide a binary ONE output signal at a time, since one and only one byte at a time of a given register may be updated. Assume, that signal A1HE on line 368 is a binary ZERO, which is indicative of their being no match between the signals A1H and AH, provided to the comparator 360 of FIG. 7b. This means, that this byte should be updated to match the signal on the address bus. This binary ZERO signal is applied to the input of an inverter 416 and to second inputs 418 and 420 of AND gates 400 and 402 respectively. The gates 400 and 402 therefore are inhibited. The inverter 416 inverts the binary ZERO signal, and a binary ONE signal is applied to the second input 422 of the AND gate 398 and in response to the concurrent provision of the binary ONE SEL1 signal on the first input 392 thereof the SEL1H signal is provided as a binary ONE at the output line 332 thereof. As previously explained relative to FIG. 7a, the SEL1H signal is provided to the control terminal of the multiplexor 276, thereby providing the high order byte on the input line 300 thereof to the output line 334 for application to the data input 336 of RAM 228 for changing the byte provided to register stage 242 to the appearing on the address line 296. If the line A1HE is at a binary ONE level, this signal is inverted by the inverter 416 and AND gate 398 is inhibited, and provides a binary ZERO output. This binary ONE signal is provided to the second inputs 418 and 420 of the gates 400 and 402 respectively to prime these gates. If the signal A1ME on line 372 is a binary ZERO indicating this byte is being updated, this signal is inverted by an inverter 424 and provided to the third input 426 of the AND gate 400 providing a binary ONE output signal on the SEL1M line 338 which is provided to the control terminal of the multiplexor 284 of FIG. 7a. Assuming that the signal A1LE on line 276 is a binary ZERO indicating that this byte should be updated, this signal is applied to the input of inverter 428 with the binary ONE signal output being applied to the fourth input 430 of the AND gate 402. Since all of the other signals to the input thereof are also a binary ONE at this time, the SEL1L signal on line 344 is then a binary ONE and is provided to the control terminal of the multiplexor 392 to control the operation thereof as previously explained.

Assuming that the SEL1 signal is a binary ZERO, indicating that the copy of address register AR0, register 232, is to be updated, each of the AND gates 398, 400 and 402 are disabled, and the inverter 390 provides a binary ONE signal output to the first input of each of the AND gates 410, 412 and 414, enabling one of these gates at a time to provide a select signal to the multiplexors associated with the copy of address register AR0, register 232. Assuming that the signal A0HE on line 336 is a binary ZERO indicating this byte did not match the signal AH on the address bus line, this signal is applied to a second input 432 and a second input 434 of the AND gate 412 and 414 disabling each of these at this time. This binary ZERO signal is inverted by the inverter 436 providing a binary ONE signal to the second input 438 of the AND gate 410, and in response thereto the SEL0H signal becomes a binary ONE and is provided on the line 314 to the control terminal of the multiplexor 252. Assuming next in the cycle of operations that the signal A0HE on line 366 is a binary ONE, the AND gate 410 is disabled, and the gates 412 and 414 then have enabling signals on the inputs 432 and 434 respectively. If at this time the signal A0ME on line 370 is a binary ZERO, this signal is applied to the third input 440 of the AND gate 414 disabling same, and is inverted by an inverter 442 for applying a binary ONE signal to the third input 444 of the AND gate 412 for enabling same to provide a binary ONE SEL0M signal on line 320 for enabling the multiplexor 260. In the next cycle of operation if the A0ME signal on line 370 is a binary ONE, this signal is inverted by the inverter 442 for providing a disabling signal to the third input 444 of the AND gate 412 and as an enabling signal on the line 440 to the third input of AND gate 414. If, the signal A0LE on line 374 is a binary ZERO indicating there is a mismatch with the low order byte, this signal is inverted by an inverter 446 for providing a binary ONE signal to the fourth input 448 of the AND gate 414, for providing a binary ONE SEL0L signal on line 326 for enabling the multiplexor 268. It is seen therefore that one and only one of the select signals at a time is a binary ONE for providing a given one of the multiplexors of FIG. 7a the ability to update the selected byte of the copy of the selected address register.

Figure 8:
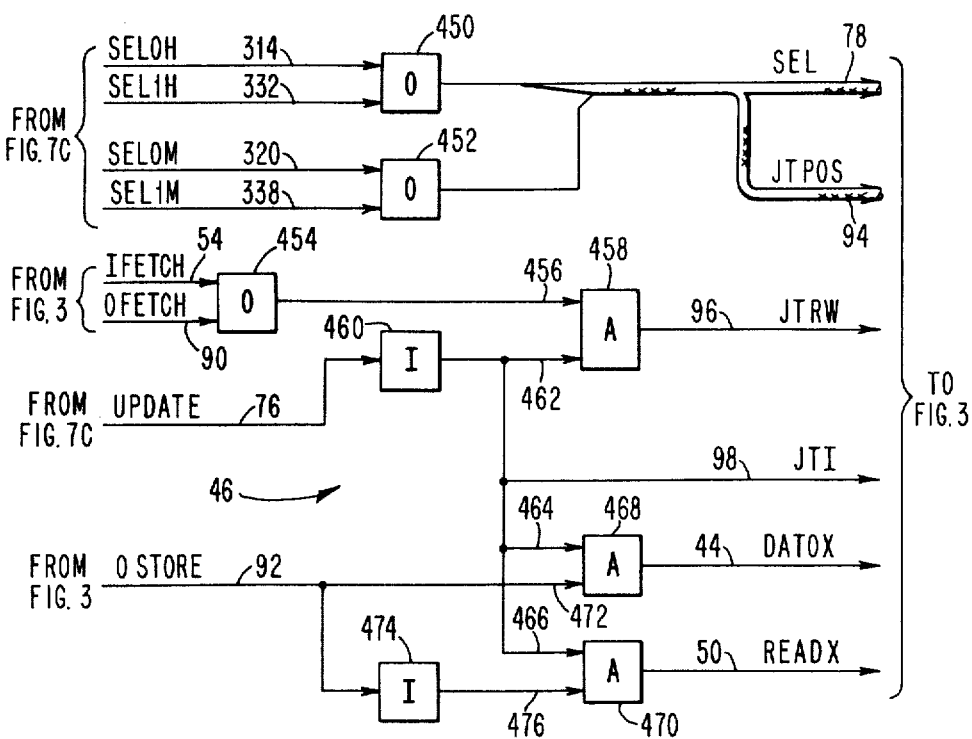
FIG. 8 is a detailed block diagram representation of the bus control unit which is illustrated generally in FIG. 3.

FIG. 8 is a detailed block diagram of the bus control unit 46 which is illustrated generally in FIG. 3. The SEL0H and SEL1H signals from FIG. 7c are applied via lines 314 and 332 to first and second inputs of an OR gate 450. The SEL0M and SEL1M signals are applied via lines 320 and 338 respectively to an OR gate 452. The output lines from the gates 450 and 452 are provided to line 78 as the SEL signal and to line 94 as the JTPOS signal which is applied to the T-bus. One and only one of the signals applied to the respective OR gates 450 and 452 may be a binary ONE at a given time, as previously described relative to FIG. 7c. As previously set forth, the SEL and JTPOS signal is a two bit signal, with the output from the gate 450 being the high order bit and the output from the gate 452 being the low order bit. The signals IFETCH and OFETCH are provided via lines 54 and 90 respectively to an OR gate 454 with the output thereof being applied to a first input 456 of an AND gate 458. The UPDATE signal on line 76 from FIG. 7c is applied to the input of an inverter 460 with the output thereof being applied to a second input 462 of the gate 458 and to first inputs 464 and 466 of AND gates 468 and 470 respectively. In response to the provision of either the IFETCH of OFETCH signal to the input of the OR gate 454 and the UPDATE signal being at a binary ZERO level, the AND gate 458 is enabled to provide the signal JTRW to the line 96 and to the T-bus. In response to the UPDATE signal being at a binary ZERO level, the binary ONE signal from the inverter 460 is applied to the line 98 as the JTI signal. The OSTORE signal on line 92 is provided to a second input 472 of the AND gate 468 and to the input of an inverter 474. In response to the UPDATE signal being at a binary ZERO level and the OSTORE signal being at a binary ONE level, the AND gate 468 provides the DATOX signal at a binary ONE level on the line 44 for reading out the input to the amplifier 42 on FIG. 3. In response to the OSTORE signal being at a binary ZERO level, the inverter 474 inverts same and applies this signal to a second input 476 of the AND gate 470, and in response to the UPDATE signal being concurrently a binary ZERO the AND gate 470 provides a binary ONE, READX signal on the output line 60 for reading the input of the amplifier 48 of FIG. 3 into the data register 36.

Figure 9:
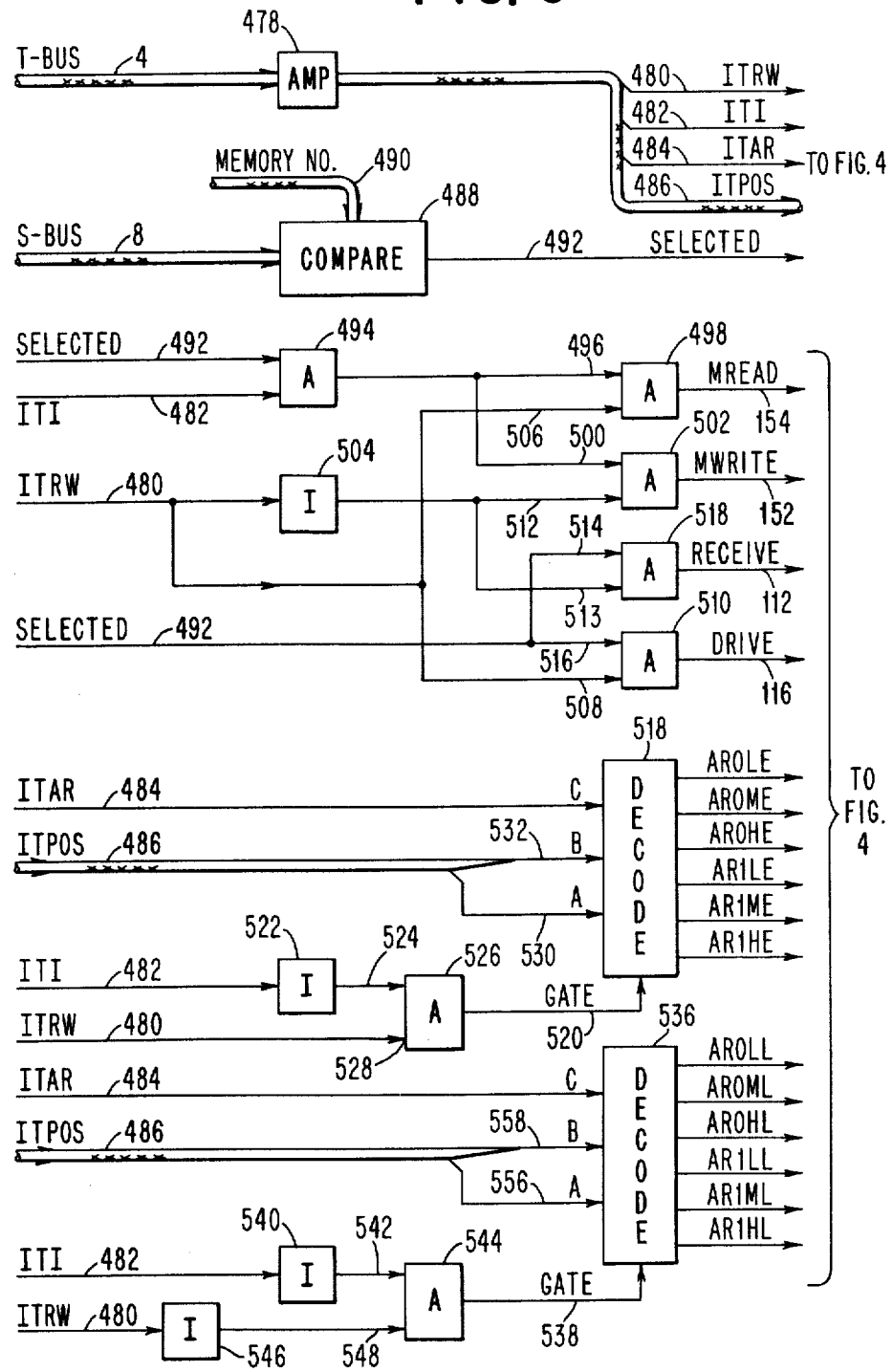
FIG. 9 is a detailed block diagram representation of the logic required to generate the control signals for the memory subsystem illustrated in FIG. 4.

FIG. 9 is a detailed block diagram representation of the control circuitry for generating control signals for controlling a memory subsystem as illustrated in FIG. 4. The T-bus signals JTRW, JTI, JTAR, and JTPOS are provided on the T-bus 4 to an amplifier 478 which reshapes and repowers the T-bus signals as control signals ITRW on line 480, ITI on line 482, ITAR on line 484 and ITPOS on line 468. The memory subsystem selection signal on the S-bus 8 is applied to a comparator network 488 for comparing the select signal with the memory number for this subsystem on line 490. In practice, the memory number is hard wired. If the memory number and the select signal are identical, a binary ONE signal is provided on the selected line 492 which is indicative of this memory subsystem being selected to exchange information with the processor. The SELECTED signal on line 492 and the ITI signal on line 482 are applied to first and second inputs respectively of an AND gate 494 with the output thereof being applied to a first input 496 of an AND gate 498 and a first input 500 of an AND gate 502. ITI is at a binary ONE level when it is the memory array 114 (FIG. 4) and not the address registers 26 and 28 that are to be read or written. The signal ITRW on line 480 is applied to an inverter 504 and to the second input 506 of the AND gate 498 and to a first input 508 of an AND gate 510. The ITRW signal is at a binary ONE level when a READ operation is requested. Therefore, when ITRW is a binary ONE and is applied to the second input 506 of the AND gate 498 concurrent with the SELECTEE signal and ITI being at a binary ONE level the AND gate 498 provides a binary ONE MREAD signal on the line 154 which is applied to the memory array 114 (FIG. 4) for reading information therefrom. The output signal from the inverter 504 is applied to a second input 512 of the AND gate 502, with a binary 1 signal indicative of an MWRITE operation being provided on line 152 when the signal ITRW is a binary ZERO and the signals SELECTED and ITI are binary ONE'S respectively, which indicates that a WRITE operation is requested, with the WRITE signal being provided to memory array 114 for writing information therein. The SELECTED signal on line 492 is also provided to first inputs 514 and 516 of AND gates 518 and 510 respectively. As previously set forth the signal applied to the first input 513 of the AND gate 518 is the inverse of the signal ITRW. Accordingly, the RECEIVE signal provided on the output line 112 from the AND gate 518 is at a binary ONE level whenever the SELECTED signal is at a binary ONE level and the ITRW signal is at a binary ZERO level, indicating that a WRITE operation is requested. The RECEIVE signal is applied to the gating input of receiver 108 (FIG. 3) for passing information on the X-bus 6 to the internal bus 106 of the memory subsystem. The DRIVE signal on line 116 is at a binary ONE level whenever the SELECTED signal on input 516 and the ITRW signal on input 508 are concurrently at a binary ONE level indicating that a READ operation is requested. The DRIVE signal is applied to the enabling input of the driver 110 such that information on the internal bus 106 may be transferred to the X-bus 6 for transmission to the processor.

The signals to enable the tri-state drivers of FIG. 4, which receive at inputs the respective bytes from AR0 address register 6 and AR1 address register 28 for provision to the internal bus 106, are derived from a decoder 518 which has as inputs the signals ITAR and ITPOS. No output is available from the decoder 518 unless the gate input on line 520 is at a binary ONE level. This signal is derived from ITI on line 482 and ITRW on line 480. ITI is applied to the input of an inverter 522 and from there to a first input 524 of an AND gate 536 which receives ITRW at the second input 528 thereof. It is seen therefore, that the gate signal on line 520 is at a binary ONE level when ITI is at a binary ZERO level and ITRW is at a binary ONE level, indicating that an address register operation, as opposed to a memory array operation, is requested. Only one output line of the decoder at a time may be at a binary ONE level. The output is selected by the A, B and C inputs to the decoder on lines 530, 532 and 484 respectively. These inputs are taken to be the 3 bits of a binary representation of a number. The C input is the most significant bit and is driven by ITAR on line 484 which selects which address register, AR0 or AR1 is to place its output on the internal bus 106. The A and B inputs on lines 530 and 532 respectively are driven by the 2 bit ITPOS signal on line 486 which selects which section, that is the low order, middle order or high order byte of the address register is to be placed on the internal bus. For example, if it is desired to place the middle byte of address register 1, that is register 28, on the internal bus 106, ITAR is 1 and ITPOS is 01 selecting the number 5 output of the decoder 518. Thus, ARM1ME is the number 5 output of the decoder. The other outputs are similarly defined. The decoder 536, which is similar to the decoder 518, generates the load signals for loading the selected bytes of information into address register 0 and address register 1, registers 26 and 28 respectively. The decoder 536 is enabled only when its gate input on line 538 is at a binary ONE level. This signal is derived from the ITI signal on line 482 and the ITRW signal on line 480, with ITI being provided to the input of an inverter 540 and with ITRW being applied to the input of an inverter 546. The output from inverters 540 and 546 are applied to the first and second inputs 542 and 548 respectively of AND gate 544. It is seen, that the output from the AND gate 544 is at a binary ONE level only if ITI and ITRW are concurrently at binary ZERO levels, indicating that an address register operation is desired as well as WRITE operation. The signal inputs to the decoder 536 are ITAR on line 484 being applied as the most significant bit to the C input thereof, and with the 2 bit ITPOS signal on line 486 being applied on lines 556 and 558 to the A and B inputs respectively. Again, one and only one output at a time from the decoder 536 may be at a binary ONE level, thus permitting one and only one byte at a time of a given address register in the memory subsystem to be updated.

A common bus information transmission system between a processor and a plurality of subsystems has been described, wherein the number of pins on the processor and the subsystems have been reduced by transmitting only those bytes of an address which differ from a recently accessed address.

INDUSTRIAL APPLICABILITY

It is an object of the invention to provide an improved common bus communication system.

It is another object of the invention to provide an improved common bus communication system wherein the number of lines on the bus are reduced.

It is yet another object of the invention to provide an improved common bus communication system between a processor and a plurality of subsystems, wherein the number of pins on the processor and each subsystem is reduced.

It is still another object of the invention to provide an improved common bus communication system between a processor and a plurality of subsystems wherein only those bytes of a selected address which differ from the corresponding bytes of a previous address are transmitted sequentially for accessing a selected memory location in the subsystem.

It is yet another object of the invention to provide an improved common bus communication system between a processor and a plurality of subsystems, wherein address information is three bytes wide and the address information line on the bus is one byte wide.

Having thus described my invention, what I claim as new, and desire to secure by Letters Patent is:

1. In a common bus communication system connected for information exchange between a processor and a plurality of subsystems which are each coded with a different identification number, with information exchange between said processor and a given subsystem occurring when said processor sends an information signal over said bus including the identification number of said given subsystem, in which the number of lines n on the bus are fixed, and any complete address field of an address register in a subsystem, which is to be transmitted over said bus, is m bytes wide and m is greater than the number of lines on the bus, where m and n are integers, and m>n the combination comprising:
   a memory array included in each of said subsystems;
   at least one m byte wide register included in each of said subsystems which stores the address of the last accessed memory location in a given region on said memory array;
   means included in said processor for storing a copy of the contents of said one m byte wide address register of each subsystem;
   means included in said processor for generating said coded identification number of a given one of said subsystems for selecting said given one of said subsystems to exchange information with by providing said coded identification number to said common bus for transmission to said subsystems; and
   means included in said processor for comparing on a byte by byte comparison basis the copy of the contents of said one m byte wide address register of the selected subsystem with the m byte wide information signal to be exchanged, and in response to the comparison communicating n byte at a time over said n byte wide bus to said one address register of the selected subsystem only the bytes that do not match based on the comparison for updating the address stored in said one register to select the correct address in said memory array.

2. In a common bus communication system connected for information exchange between a processor and a plurality of subsystems which are each coded with an identification number, with information exchange between said processor and a given subsystem occurring when said processor sends an information signal over said bus including the identification number of said given subsystem, in which the number of lines n on the bus is an integer submultiple of the width m of the number of bytes of the complete address field of an address register in a subsystem, where m and n are integers, the combination comprising:
   a memory array included in each of said subsystems;
   at least one m byte address register included in each of said subsystems which stores the address of the last accessed memory location in a given region in said memory array;
   means included in said processor for storing a copy of the contents of said one m byte wide address register of each subsystem;
   means, responsive to said information signal, included in said processor for generating said coded identification number of a given one of said subsystems for selecting said given one of said subsystems to exchange information with by providing said coded identification number to said common bus for transmission to said subsystems; and
   means included in said processor for comparing on a byte by byte comparison basis the copy of the contents of said one m byte wide address register of the selected subsystem with the m byte wide information signal to be exchanged, and in response to the comparison communicating n bytes at a time over said n byte wide bus, to said one m byte wide address register of the selected subsystem only the bytes that do not match based on the comparison for updating the address stored in said one m byte wide register to select the correct address in said memory array.

3. In a common bus communication system connected for information exchange between a processor and a plurality of subsystems which are each coded with an identification number, with information exchange between said processor and a given subsystem occurring when said processor sends an information signal over said bus including the identification number of said given subsystem, in which the information to be exchanged is m, where m is an integer $\geq 2$ bytes wide and the number of lines on the bus is 1 byte wide, the combinatin comprising:

a memory array included in each of said subsystem;

at least one $\geq 2$ byte wide address register included in each of said subsystems which stores the address of the last accessed memory location in a given region in said memory array;

means included in said processor for storing a copy of the contents of said one $\geq 2$ byte wide address register of each subsystem;

means, responsive to said information signal, included in said processor for generating said coded identification number of a given one of said subsystems for selecting said given one of said subsystems to exchange information with by providing said coded identification number to said common bus for transmission to said subsystems; and means included in said processor for comparing on a byte by byte comparison basis the copy of the contents of said one $\geq 2$ byte wide address register of the selected subsystem with $\geq 2$ byte the information to be exchanged, and in response to the comparison communicating 1 byte at a time over said 1 byte wide bus, to said one address register of the selected subsystem only the bytes that do not match based on the comparison for updating the address stored in said one register to select the correct address in said memory array.

4. In a common bus communication system connected for information exchange between a processor and a plurality of subsystems which are each coded with an identification number, with information exchange between said processor and a given subsystem occurring when said processor sends an information signal over said bus including the identification number of said given subsystem, in which the information to be exchanged is m, where m is an integer $\geq 3$ bytes wide and the number of lines on the bus is 1 byte wide, the combination comprising:

a memory array included in each of said subsystems;

first and second $\geq 3$ byte wide address registers included in each of said subsystems, with said first address register storing the address of the most recently accessed memory location in one region in said memory array, and said second address register storing the address of the most recently accessed memory location in a different region in said memory array;

means included in said processor for storing copies of the contents of each of said $\geq 3$ byte wide first and second address registers of each subsystem;

means included in said processor for generating said coded identification number of a given one of said subsystems for selecting said given one of said subsystems to exchange information with by providing said coded identification number to said common bus for transmission to said subsystems; and means included in said processor for comparing the $\geq 3$ byte wide information signal to be exchanged with the copies of the $\geq 3$ byte wide addresses stored in said first and second storage registers of the selected subsystem to determine which copy of the two most closely corresponds on a byte by byte comparison basis with said information to be exchanged, and in response to said comparison communicating 1 byte at a time over said 1 byte wide bus to one of the two address registers of the selected subsystem which most closely matches only those bytes which do not match based on the comparison for providing an updated address to said one of the two registers which most closely matches, for selecting the correct address in said memory array.

5. In a common bus communication system connected for information exchange between a processor and a plurality of subsystems, and in which the information to be exchanged in three bytes wide and the number of lines on the bus is one byte wide, the combination comprising:

a memory array in each of said subsystems including a plurality of addressable storage locations in which information is stored;

first and second three byte wide address storage registers in each of said subsystems, in which each register respectively stores one of the two most recently used three byte wide addresses of two separate regions of said memory array;

means in each of said subsystems which is selectively responsive to the three byte wide address stored in each of said first and second address storage registers to select a memory location in said memory array corresponding to the address stored in one of said first and second storage registers;

means in said processor for providing a three byte wide information signal, with said information signal being indicative of which of said subsystems is to be communicated with, and being indicative of the selected address in said memory array;

means in said processor responsive to said information signal for selecting the subsystem to communicate with;

means in said processor for storing copies of the three byte wide addresses stored in the first and second address storage registers in each of said subsystems; and means in said processor for comparing the three bytes of said information signal with the three bytes of the copies of the addresses stored in the first and second address storage registers of the selected subsystem to determine which copy of the two most closely corresponds on a byte by byte comparison basis with said information signal, and in response to said comparison communicating one byte at a time over said one byte wide bus to the one of the two registers which most closely matches, only the bytes which do not match based on the comparison for providing an updated address to said one of the two registers which most closely matches, for selecting the correct address in said memory array for communication between that address in the memory array and said processor.

6. The combination claimed in claim 5, wherein said subsystems include memory devices.

7. The combination claimed in claim 6, wherein said subsystems further include at least one peripheral device controller.

* * * * *